United States Patent [19]
Kawada et al.

[11] Patent Number: 5,334,924
[45] Date of Patent: Aug. 2, 1994

[54] INDUCTION MOTOR CONTROL SYSTEM

[75] Inventors: Shigeki Kawada, Hino; Hiroshi Ishida, Hamuramachi, both of Japan

[73] Assignee: Fanuc Ltd, Yamanashi, Japan

[21] Appl. No.: 316,763

[22] Filed: Oct. 30, 1981

[51] Int. Cl.[5] .................................... H02P 5/40
[52] U.S. Cl. ........................................ 318/811
[58] Field of Search ............ 318/811, 800, 803, 805, 318/807-812

[56] References Cited

U.S. PATENT DOCUMENTS

| | | |
|---|---|---|
| 3,349,303 | 10/1967 | Burnight . |
| 3,790,006 | 2/1974 | Hartman . |
| 4,091,294 | 5/1978 | Zankl et al. .......................... 318/810 |
| 4,140,956 | 2/1979 | Pritchard ............................ 318/696 |
| 4,227,137 | 10/1980 | Hartman ............................ 318/801 |
| 4,263,542 | 4/1981 | Schulze et al. ...................... 318/803 |
| 4,272,715 | 6/1981 | Matsumoto ........................ 318/799 |
| 4,316,132 | 2/1982 | Geppert ............................. 318/721 |

OTHER PUBLICATIONS

Williams, B. W., "Microprocessor Control of DC 3-Phase Thyristor Inverter Circuits", IEE Transaction Indust'l, Elec & Control, vol. IECI-27-No. 3 Aug. 1980 pp. 223-238.
Sen et al, "Induction Motor Drives with Microcomputer Control Systems," Conference IAS Annual Meeting, 1980, Cincinnati, Ohio Sep. 28-Oct. 3, 1980.
Polk, D. R., "Algorithm for Implementating PID Control for Servo Systems on Microprocessor", IBM Tech Bull vol. 23, No. 8 p. 3514 (Jan. 1981).

Primary Examiner—David Smith
Attorney, Agent, or Firm—Staas & Halsey

[57] ABSTRACT

Speed control of an induction motor is effected in digital fashion through use of a computer but without complex processing, and with a computer that need not be large in scale. This is accomplished by processing at least a speed command signal, actual speed signal and torque signal in analog fashion, enabling simplification of an induction motor speed control digital processing section which performs all other control operations in a digital manner. In a speed control network having a closed loop, a frequency-to-voltage converter, adder-subtractor, proportional integrator, polarity determining circuit absolute value circuit and voltage-to-frequency converter are constructed of circuitry operable on the basis of analog values, with all other circuits being constructed of circuitry operable on the basis of digital values.

6 Claims, 3 Drawing Sheets

INDUCTION MOTOR CONTROL SYSTEM

FIELD OF THE INVENTION

This invention relates to an induction motor control system and, more particularly, to an induction motor control system for controlling an induction motor in digital fashion.

BACKGROUND OF THE INVENTION

Typical methods of induction motor control include V/F control for controlling the voltage-frequency ratio of the induction motor, and slip-frequency control for controlling the current and slip frequency of the induction motor. In both of these methods the control loop is composed of a circuit, such as a analog or digital circuit, which is capable of performing only a single function. It is therefore difficult to modify the system design and to execute a complicated control operation, and the system cost is high.

In recent years, inexpensive, multiple-function high-speed microcomputers have become readily available for use in controlling induction motors in digital fashion. Such digital control is advantageous in that it reduces system cost and makes it easier to execute complicated control operations and to modify the design. Nevertheless, the conventional digital control systems call for an expensive AD converter, a microcomputer having a large number of bits, and numerous, comparatively time-consuming multiplication process steps, in order to control the induction motor in a highly precise manner. The reason is as follows.

In slip-frequency control, the steps include deriving a difference, known as the slip speed, between a commanded speed and the actual motor speed, applying an error voltage, indicative of this difference, to a proportional integrating circuit for processing, and then controlling the induction motor in a predetermined manner using the output of the proportional integrating circuit. With the conventional systems, such slip-frequency control is performed digitally by subjecting an analog speed command voltage and an analog motor speed signal to an AD conversion to obtain the corresponding digital values, finding the difference between these two digital values by means of a digital operation, and then subjecting the resulting difference value to a proportional integration operation. If we assume that eight bits are necessary to express the difference value accurately, then at least 16 bits would be required to express the speed command and the actual motor speed since both of these quantities are much larger than the difference value. In other words, to express the difference value (slip speed) accurately, the conventional method calls for a large number of bits to express the commanded speed and motor speed, as well as for a highly accurate AD converter for converting the commanded speed and actual motor speed voltages into digital signals. Furthermore, the proportional integration operation which must be performed can be expressed as follows:

$$T = K_1 (c-V) + K_2 \Sigma (V_c - V) \quad (1)$$

$$\Sigma(V_c - V) = \Sigma(V_c - V) + (V_c - V) \quad (2)$$

where the commanded speed is $V_c$, the actual motor speed is $V$, and the proportion constants are $K_1$, $K_2$. The foregoing operation cannot be executed at high speed with the processing capability of a microcomputer.

SUMMARY OF THE INVENTION

Accordingly, an object of the present invention is to provide a novel control system in which the control loop of an induction motor is simply constructed, but in which the advantages of digital control are preserved.

Another object of the present invention is to provide an induction motor control system which preserves the advantages of digital control but without requiring a costly AD converter, which permits the use of a microcomputer that need have a resolution of only eight bits, and which will not lower the processing capability of the microcomputer.

These and other objects and features of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
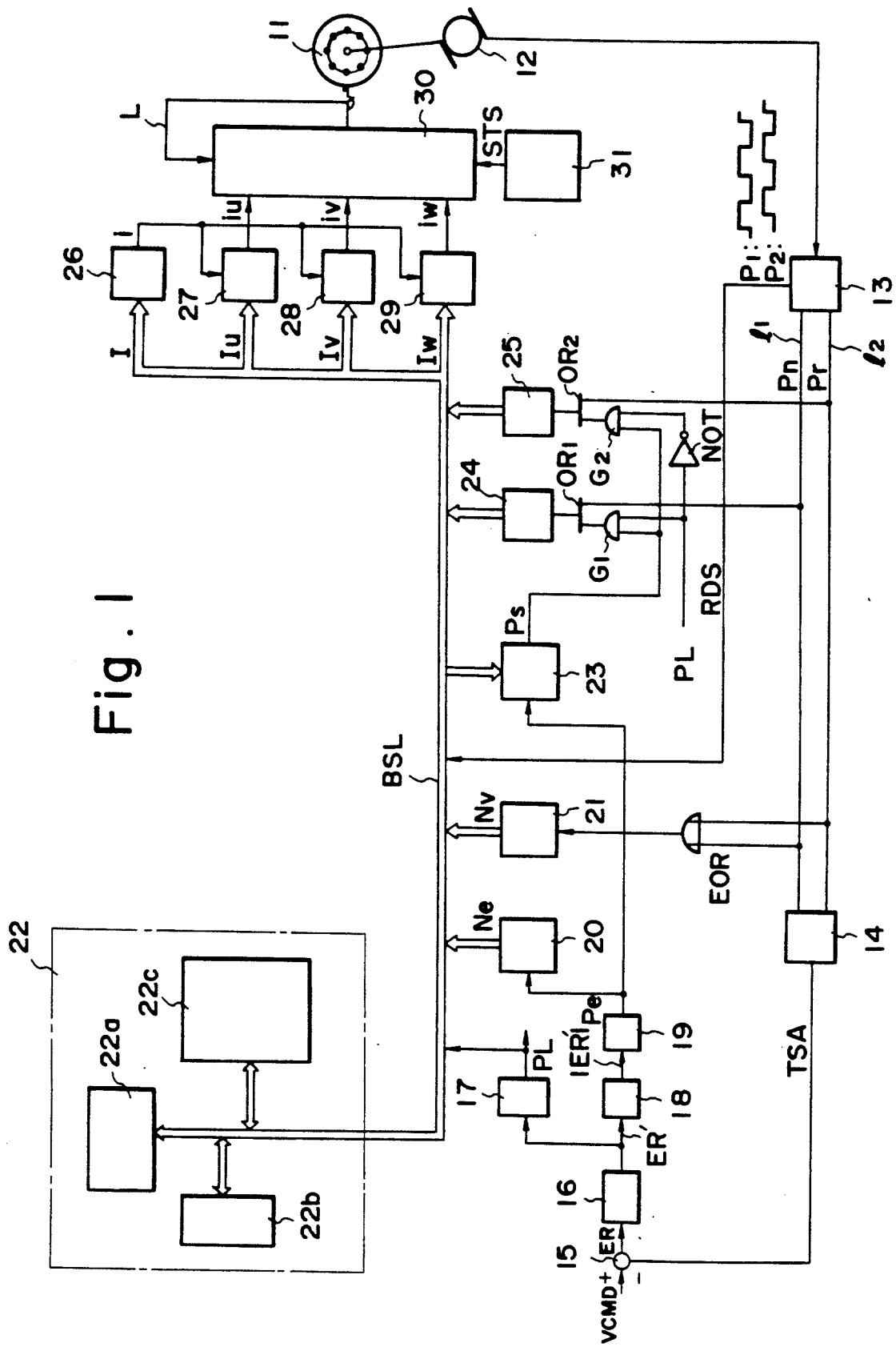
FIG. 1 is a block diagram illustrating a preferred embodiment of the present invention.

Referring first to FIG. 1, numeral 11 denotes a three-phase induction motor. A pulse generator 12 is provided for generating first and second pulse trains $P_1$, $P_2$, displaced in phase from each other by $\pi/2$, each pulse train having a frequency $f_v$ which is proportional to the rotational speed of the induction motor 11. The pulse trains $P_1$, $P_2$ are applied to a quadrupling circuit 13 which differentiates the pulse trains to generate and to deliver on lines $l_1$, $l_2$ pulse trains $P_n$, $P_r$ each having a frequency $4.f_v$, namely a frequency four times that of $f_v$. The pulse train $P_n$ is generated during forward rotation of the induction motor, and the pulse train $P_r$ during reverse rotation of the induction motor. The quadrupling circuit 13 produces also a rotational direction signal RDS upon determining which of the pulse trains $P_1$, $P_2$ leads in phase. A frequency-to-voltage (F/V) converter 14 receives whichever of the pulse trains $P_n$, $P_r$ is being generated and produces a voltage which is proportional to the frequency thereof, namely a voltage indicative of actual speed TSA, which is proportional to the rotational speed of the induction motor 11. An adder/subtractor 15 receives the actual speed signal TSA, as well as a speed command signal VCMD, and is adapted to produce an error signal ER indicative of the difference between VCMD and TSA, the signal ER representing the motor slip. The error signal ER is applied to a proportional integrating circuit 16 which subjects the signal to the operation expressed by Eqs. (1) and (2), thereby to produce an error signal ER'. A polarity determining circuit 17 determines the polarity of the error signal ER'. The error signal ER' is applied also to an absolute value circuit 18 which takes the absolute value of the signal and delivers it to a voltage-to-frequency (V/F) converter 19 for producing a pulse train $P_e$ whose frequency is proportional to the magnitude of ER'. It should be noted that the F/V converter 14, adder/subtractor 15, proportional integrating circuit 16, polarity discriminating circuit 17 and absolute value circuit 18 constitute analog circuitry.

The pulse train $P_e$ is applied to a programmable interval timer (PIT) 20. PIT 20 counts up the pulses in the pulse train $P_e$ and is reset whenever its content is read by a processing unit which will be described later. The numerical value $N_e$ held in the PIT 20 corresponds to a torque T. More specifically, a torque T can be represented as follows:

$$T = K_o \frac{sE_2^2 r_2}{r_2^2 + (sx_2)^2} \qquad (3)$$

When s is small, T may be expressed thus:

$$T \approx \frac{sE_2^2}{r_2}$$

The torque T therefore is proportional to the slip s or, in other words, is approximately proportional to the error ER. In Eq. (3), $r_2$ and $x_2$ represent the secondary resistance and the secondary reactance, respectively, of the induction motor, and $E_2$ represents the secondary voltage.

A PIT 21 is adapted to count up whichever of the pulse trains $P_n$ or $P_r$ is being generated by the quadrupling circuit 13, the pulse train arriving through an exclusive-OR gate EOR, and is reset whenever its content is read by the aforementioned processing unit. The content $N_v$ of PIT 21 is a value corresponding to the motor speed.

Figure 2:
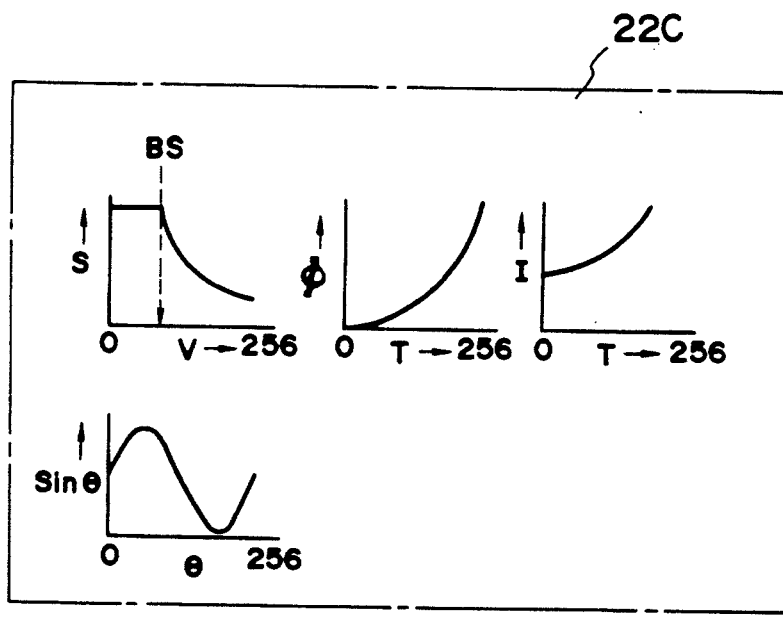
FIG. 2 is an illustrative view useful in describing the data stored in a memory included in the block diagram of FIG. 1.

Numeral 22 denotes a microprocessor which includes the aforementioned processing unit, indicated at numeral 22a, a control program memory 22b, and a data memory 22c for storing a variety of characteristics and data. Specifically, the data memory 22c digitally stores, as function tables, the characteristics illustrated in FIG. 2, namely a torque vs. amplitude characteristic (T-I characteristic), a torque vs. phase difference characteristic (T-$\phi$ characteristic), a rotational speed vs. slip characteristic (V-S characteristic), and a rotational angle vs. sinusoidal value characteristic (sine pattern). As for the T-$\phi$ characteristic, the phase difference may be expressed as follows:

$$= \tan^{-1}\left(\frac{sx_2}{r_2}\right) \qquad (4)$$

where $r_2$ is the resistance of the secondary winding, $x_2$ is the reactance of the secondary winding when the induction motor is at rest, and s is the slip. When s is small, the characteristic is as shown in FIG. 2. In the T-I characteristic, the primary current $I_1$ is expressed:

$$I_1 = I_o + I_1' \qquad (5)$$

$$= I_o + \frac{s}{\alpha\beta} \frac{sE_2}{\sqrt{r_2^2 + (sx_2)^2}}$$

where $I_o$ is the excitation current, $I_1'$ is the primary load current, $\alpha$ is the turn ratio, $\beta$ is the phase ratio, and $E_2$ is the secondary induced electromotive force. When s is small, the characteristic is as shown in FIG. 2. As for the V-S characteristic or slip pattern, the slip s is constant for a motor speed less than a base speed BS, and is inversely proportional to the motor speed for values greater than the base speed BS.

The control program memory 22b stores a control program which instructs the processing unit 22a to execute such operations as reading the torque T, speed V and a rotational angle $\theta$ described below, and controlling the slip frequency on the basis of T, V and $\theta$, and on the basis of the function tables, etc.

A programmable interval time (PIT) 23 also receives the pulse train $P_e$ from the V/F converter 19 and is operable to frequency-divide the pulse train $P_e$. The PITs 21, 23, and processing unit 22a operate in the following manner. The processing unit 22a reads the content (motor speed) of PIT 21 at a fixed period and, using the V-S characteristic (slip pattern), derives a numerical value which corresponds to the motor speed, and which is preset in PIT 23. If we let the capacity of PIT 23 be M, and let the preset value be m, then PIT 23 will deliver a single slip pulse $P_s$ each time the V/F converter generates (M-m)-number of pulses $P_e$. Thus, PIT 23 divides the pulse train $P_e$ by (M-m) to produce a slip pulse train $P_s$. This adjusts the frequency of the slip pulse train $P_s$ to the rate at which the pulses $P_n$ or $P_r$ are generated, the frequency of these pulses being proportional to the rotational speed of the motor.

Programmable interval timers are denoted also at numerals 24, 25. PITs 24, 25 cannot count reversibly, that is, they can count in only one direction. PIT 24 counts up the forward rotation pulse train $P_n$ generated during forward rotation of the motor 11, as well as the slip pulse train $P_s$. PIT 25 counts up the reverse rotation pulse train $P_r$ generated during reverse rotation of the motor 11, as well as the slip pulse train $P_s$. Assume that 256 of the pulses $P_n$ or $P_r$ are generated for one revolution of the motor 11, and assume that the capacity of the PITs 24, 25 is 256. Then, substracting the content $\theta_B$ of PIT 25 from the content $\theta_A$ of the PIT 24 will give a value $\theta$ (equal to $\theta_A - \theta_B$) indicative of the present angular position, or orientation, which takes into account the load angle due to slip. $G_1$ and $G_2$ designate AND gates, NOT a NOT gate, and $OR_1$, $OR_2$ denotes OR gates. When the error ER' is positive (indicated by a logical "1" level for the polarity signal PL from polarity determining circuit 17), AND gate $G_1$ opens to deliver the slip pulse train $P_s$ solely to PIT 24. When the error ER' is negative (polarity signal PL at logical "0"), AND gate $G_2$ opens to deliver the slip pulse train $P_s$ solely to the PIT 25. Digital-to-analog (DA) converters are shown at numerals 26 through 29. The input to DA 26 is the primary current amplitude (a digital value) based on the T-I chracteristic, and its output is an analog signal i. The respective inputs to the DA converters 27, 28, 29 are three-phase sine waves (digital values) computed by the processing unit 22a, namely the sine waves:

$$I_U = \sin(\theta + \phi) \qquad (6)$$

$$I_V = \sin\left(\theta + \phi + \frac{2\pi}{3}\right) \qquad (7)$$

$$I_W = \sin\left(\theta + \phi + \frac{4\pi}{3}\right) \qquad (8)$$

as well as the primary current amplitude signal i from DA converter 26. The DA converters 27 through 29 convert the sine waves, in the form of digital values, into three-phase sine waves $i_u$, $i_v$, $i_w$ which are analog signals of a predetermined amplitude.

The analog sine wave signals $i_u$, $i_v$, $i_w$ are applied to an induction motor drive circuit 30. An oscillator 31 generates a sawtooth signal STS which is also applied to the induction motor drive circuit 30, the period of the sawtooth signal STS being the same as that of the signals I, $I_U$, $I_V$, $I_W$ as they enter the respective DA converters 26 through 29. L denotes a current feedback line.

Figure 3:
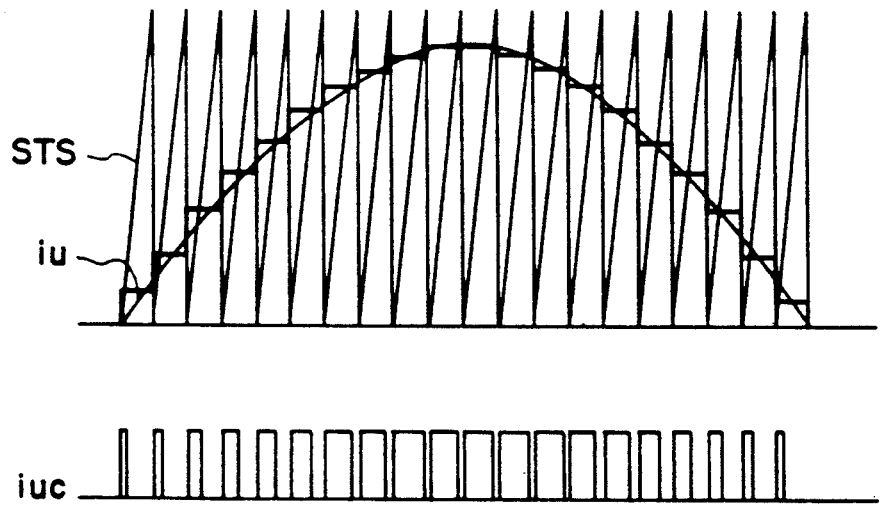
FIG. 3 is a waveform diagram useful in describing pulse width modulation.
Figure 4:
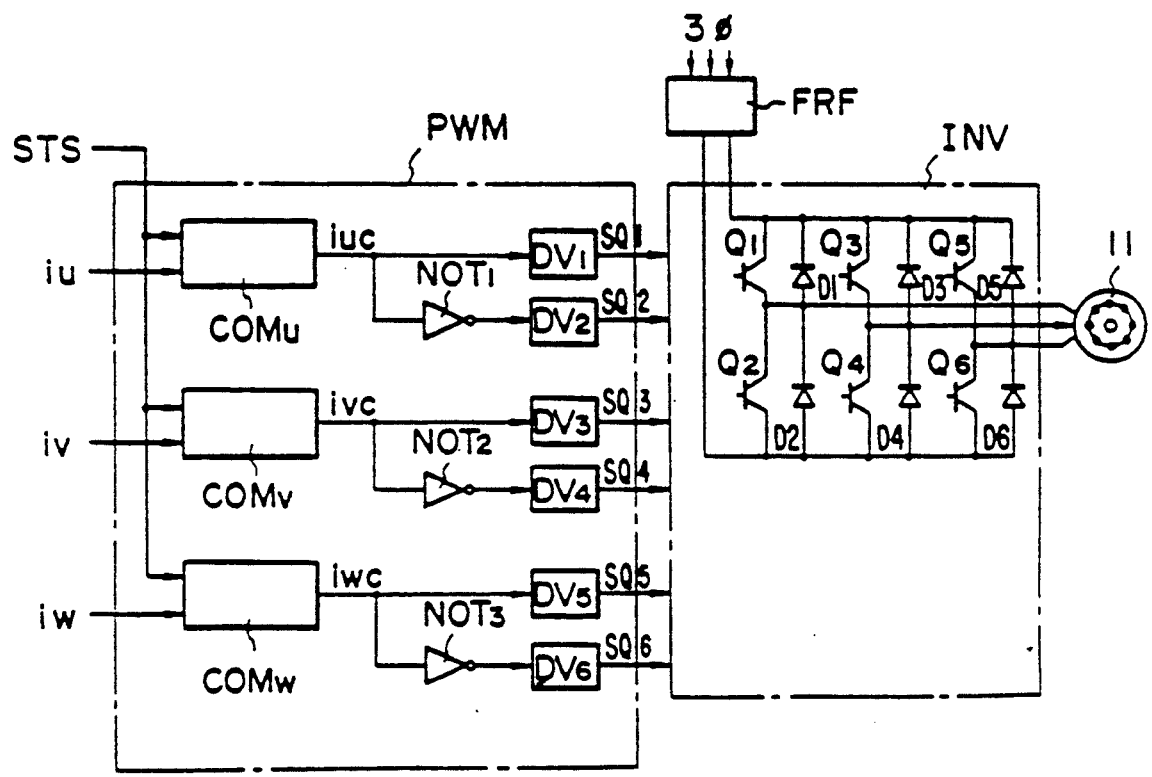
FIG. 4 is a block diagram of a three-phase induction motor drive circuit.

The induction motor drive circuit 30 has the construction shown in FIG. 4. It comprises a pulse width modulator PWM which includes comparators $COM_U$, $COM_V$, $COM_W$, NOT gates $NOT_1$ through $NOT_3$ and drivers $DV_1$ through $DV_6$, an inverter INV which includes six power transistors $Q_1$ through $Q_6$, and six diodes $D_1$ through $D_6$, and a three-phase full-wave rectifier FRF. Each of the comparators $COM_U$, $COM_V$, $COM_W$ is adapted to compare the amplitude of the sawtooth signal STS with the amplitude of the respective three-phase AC signal $i_u$, $i_v$, $i_w$, and to deliver logical "1" when the amplitude of the AC signal input is larger than the sawtooth signal, or logical "0" when the amplitude of the sawtooth signal is larger. Regarding the signal input $i_u$, it will be seen that the output of comparator $COM_U$ is a current command $i_{uc}$ having the shape shown in FIG. 3. The other comparators will produce similar outputs $i_{vc}$, $i_{wc}$ which are not shown in FIG. 3. In other words, the comparators $COM_U$, $COM_W$, $COM_V$ produce three-phase current commands $i_{uc}$, $i_{vc}$, $i_{wc}$ pulse-width modulated in accordance with the amplitudes of $i_u$, $i_v$, $i_w$. The NOT gates $NOT_1$ through $NOT_3$ and drivers $DV_1$ through $DV_6$ cooperate to convert the current commands $i_{uc}$, $i_{vc}$, $i_{wc}$ into drive signals $SQ_1$ through $SQ_6$ for switching on and off the transistors $Q_1$ through $Q_6$ that constitute the inverter INV.

The operator of the present invention will now be described in detail.

Referring to FIG. 1, when an analog speed command VCMD is issued by speed command means (not shown), the induction motor 11 attempts to rotate forwardly or reversely in accordance with the value of the command. As the motor 11 rotates, the pulse generator 12 generates the first and second pulse trains $P_1$, $P_2$ which are displaced in phase by $\pi/2$ from each other and which are proportional in frequency to the rotational speed of the motor 11. The quadrupling circuit 13, upon determining which of the pulse trains $P_1$, $P_2$ leads the other, sends the rotational direction signal RDS out on bus line BSL, sends the forward rotation pulse train $P_n$ out on line $l_1$ during forward rotation of the induction motor, and sends the reverse rotation pulse train $P_r$ out on line $l_2$ during reverse rotation of the induction motor. Assume that the induction motor is rotating in the forward direction. The forward rotation pulse train $P_n$ will then be applied to F/V converter 14 and to programmable interval timers 21, 24 where the pulses are counted up.

The F/V converter 14 produces an actual speed signal TSA of a voltage which is proportional to the induction motor speed. This signal is applied to the adder/subtractor circuit 15 which produces the error signal ER between the actual speed TSA and the commanded speed VCMD which arrives from the speed command means. The error signal ER is an analog quantity. The signal ER is proportionally integrated by the proportional integrating circuit 16 for conversion into the error signal ER' which is then applied to the polarity determining circuit 17 and to the absolute value circuit 18. The polarity determining circuit 17 senses the polarity of the error signal ER' and delivers the polarity signal PL on bus line BSL. The absolute value circuit 18, mean while the absolute value of signal ER' and delivers this value to the V/F converter 19 which is adapted to produce the pulse train $P_e$ of a frequency proportional to the absolute value of ER'. Pulse train $P_e$ is counted up by the programmable interval timer (PIT) 20, the counted value $N_e$ being a numerical value which corresponds to the torque T mentioned above. The processing unit 22a reads this value periodically, that is, at predetermined fixed intervals.

The counted value $N_v$ in PIT 21 corresponds to the rotational speed of the induction motor 11 and is read periodically in the same manner as the content (torque T) of PIT 20 by means of the processing unit 22a, PIT 21 being reset whenever its content is read. Whenever the processing unit 22a reads the content (rotational speed) of PIT 21, it responds to the control program to obtain, from the function table of the V-S characteristic (slip pattern), the value m which corresponds to the rotational speed, the processing unit presetting this value in the PIT 23. The PIT 23 receives also the pulse train $P_e$ from V/F converter 19 and divides the pulse train by (M-m) as described above, thereby converting it into the pulse train $P_s$ indicative of motor slip. Since the polarity signal PL is a "1" the slip pulse train $P_s$ passes through AND gate $G_1$ and OR gate $OR_1$ to be counted up by the PIT 24. It should be noted that PIT 24 counts the forward rotation pulses $P_n$ as well, as the slip pulses $P_s$, so that its content $\theta_A$ represents the total forward rotation angle of the motor. Similarly, the content $\theta_B$ of programmable interval timer 25 represents the total reverse rotation angle of the motor. Processing unit 22a reads $\theta_A$, $\theta_B$ at fixed periods and performs the operation $\theta = \theta_A - \theta_B$ each time it does so. The quantity $\theta$ is the present angular position of the motor.

When the foregoing has been accomplished, the processing unit 22a, under the control of the control program, obtains the three-phase sine waves $I_U$, $I_V$, $I_W$ expressed by Eqs. (6), (7), (8), as well as the primary current amplitude I, using the T-$\phi$ characteristic, T-I characteristic and sine pattern stored in the data memory 22c as well as the computed rotation angle $\theta$ and the torque T. The processing unit 22a delivers these values $I_U$, $I_V$, $I_W$ and I to the DA converters 26, 27, 28, 29, respectively, the DA converters thereby producing the three-phase analog sine waves $i_u$, $i_v$, $i_w$ of a predetermined amplitude. These sine waves are applied to the induction motor drive circuit 30 which employs them to drive the induction motor 11. Repeating the foregoing operation brings the rotational speed TSA of the induction motor 11 into agreement with the commanded speed.

The present invention as described above offers the full advantages of a digital control system and, at the same time, uses an analog method to generate the error signal ER and to perform the proportional integration operation, so that high resolution can be achieved with a microcomputer having only a small number of bits. In addition, this feature of the invention lightens the load of the processing unit.

As many apparently widely different embodiments of the present invention can be made without departing from the spirit and scope thereof, it is tobe understood that the invention is not limited to the specific embodiments thereof except as defined in the appended claims.

What we claim is:

1. A system for controlling an induction motor by a microprocessor having a processing unit, a control program memory and a data memory, said system comprising:

memory means for storing motor characteristics including a torque-current amplitude characteristic, a torque-phase characteristic, a rotational speed-slip characteristic and a rotational angle-sinusoidal value characteristic;

means for deriving an analog value difference voltage between a voltage indicative of a speed command and a voltage indicative of the actual induction motor speed;

voltage-to-frequency conversion means for converting the difference voltage into a digital pulse train $P_e$;

means for obtaining torque information by reading, at fixed periods, $N_e$-number of pulses of the pulse train $P_e$, and for obtaining induction motor speed information by reading, at fixed periods, $N_r$-number of pulses of a pulse train having a frequency proportional to the induction motor speed;

means for deriving a numerical value corresponding to the $N_r$-number of pulses on the basis of the rotational speed-slip characteristic stored in said memory means;

first counter means, responsive to said numerical value corresponding to the $N_r$-number of pulses and to the pulse train $P_e$, for dividing said pulse train $P_e$ by said numerical value corresponding to the $N_r$-number of pulses to produce a pulse train $P_s$ indicative of induction motor slip;

means for mixing the pulse train $P_s$ with said pulse train having a frequency proportional to the induction motor speed;

second counter means for counting the pulses in the mixed pulse trains to produce rotational angle information $\phi$;

means for generating three-phase AC signals $i_u$, $i_v$, $i_w$ by executing a predetermined operation to control slip frequency, on the basis of said $N_e$-number of pulses, said rotational angle $\phi$, said torque-current amplitude characteristic, said torque-phase characteristic, and said rotational angle-sinusoidal value characteristic; and means for driving the induction motor on the basis of the three-phase sinusoidal AC signals $i_u$, $i_v$, $i_w$.

2. A system for controlling an induction motor by a computer, comprising:

generating means for generating pulses having a frequency proportional to the actual speed of the motor and for generating an analog speed signal proportional in magnitude to the actual speed of the motor;

analog adder-subtractor means for receiving an analog command speed signal and the analog speed signal and for generating an analog first error signal;

an analog proportional integrating circuit for receiving the analog first error signal and for generating an analog second error signal;

means for generating pulses having a frequency proprotional to the magnitude of the analog second error signal; and digital means, responsive to the pulses having a frequency proportional to the analog speed signal and to the pulses having a frequency proportional to the the magnitude of the second error signal, for driving said motor so that the actual speed approaches a command speed corresponding to the analog command speed signal, said digital means including first programmable interval timer means for counting the pulses having a frequency proportional to the second error signal, second programmable interval timer means for counting the pulses having a frequency proportional to the actual analog speed signal, and third programmable interval timer means for frequency-dividing the pulses proportional to the magnitude of the second error signal.

3. The system of claim 2 wherein the digital means further comprises means for combining the frequency-divided pulses and the pulses having a frequency proportional in magnitude to the of the motor speed.

4. The system of claim 3, wherein the generating means comprises:

means for generating pulses having a frequency proportional to the actual speed of the motor and for generating the analog speed signal proportional in magnitude to the actual speed of the motor.

5. The system of claim 4, wherein the means for generating pulses having a frequency proportional to the actual speed of the motor comprises:

pulse generator means operatively connected to the motor for generating first and second pulse trains, the first and second pulse trains being displaced in phase by a constant phase angle and each having a frequency proportional to the rotational speed of the motor, and means responsive to the first and second pulse trains for increasing the frequency thereof.

6. The system of claim 2, wherein the digital means further comprises means for generating digital values corresponding to sine waves, digital-to-analog converter means for converting the digital values to analog values, pulse width modulator means for using the analog signals to derive ON/OFF signals, and inverter means responsive to the ON/OFF signals for driving the motor.

* * * * *